United States Patent
Schumacher et al.

(10) Patent No.: US 9,024,742 B2
(45) Date of Patent: May 5, 2015

(54) TIRE INFLATION PRESSURE CONTROL SYSTEM AND METHOD IN MOTOR VEHICLES

(75) Inventors: Hubert Schumacher, Augsburg (DE); Jochen Hartmann, Mering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 474 days.

(21) Appl. No.: 13/432,585

(22) Filed: Mar. 28, 2012

(65) Prior Publication Data

US 2012/0249319 A1  Oct. 4, 2012

(30) Foreign Application Priority Data

Apr. 1, 2011  (DE) .................. 10 2011 006 646

(51) Int. Cl.
*B60C 23/00* (2006.01)
*B60C 23/04* (2006.01)

(52) U.S. Cl.
CPC .................. *B60C 23/0476* (2013.01)

(58) Field of Classification Search
USPC .................. 340/442, 438; 73/146
See application file for complete search history.

(56) References Cited

U.S. PATENT DOCUMENTS

| | | | |
|---|---|---|---|
| 4,909,074 A | 3/1990 | Gerresheim et al. | |
| 5,193,387 A | 3/1993 | Hodate | |
| 7,348,878 B2 * | 3/2008 | Fogelstrom | 340/442 |
| 2007/0073503 A1 | 3/2007 | Hafele et al. | |

FOREIGN PATENT DOCUMENTS

| | | |
|---|---|---|
| DE | 35 39 489 A1 | 5/1987 |
| DE | 41 29 554 A1 | 4/1992 |
| DE | 195 32 386 A1 | 3/1997 |
| DE | 103 49 003 A1 | 5/2005 |
| DE | 10 2005 045 687 A1 | 4/2007 |
| DE | 603 18 781 T2 | 2/2009 |
| WO | WO 2008/119524 A1 | 10/2008 |

OTHER PUBLICATIONS

German Search Report dated Jun. 24, 2011 with partial English translation (ten (10) pages).

* cited by examiner

*Primary Examiner* — Daryl Pope
(74) *Attorney, Agent, or Firm* — Crowell & Moring LLP

(57) ABSTRACT

A warning strategy determines in a mutually separate manner the different effects that may occur in a tire and allows the increments and their priority in the display or indication for the driver to be evaluated in a mutually separate manner. This strategy occurs in connection with a sensor which can transmit at least the outside temperature and, preferably, also the barometric pressure to an evaluation device for detecting tire inflation pressure and tire temperature. As a result, in addition to an air loss monitoring function, the load capacity of the tire can also be evaluated at least as a function of the outside temperature. The evaluation device receives further input signals, such as the vehicle velocity, the tire contact area and/or the vehicle load, whereby also a dynamic tire stress can be taken into account as an indication or display for the driver.

17 Claims, 4 Drawing Sheets

TIRE INFLATION PRESSURE CONTROL SYSTEM AND METHOD IN MOTOR VEHICLES

CROSS-REFERENCE TO RELATED APPLICATIONS

This application claims priority under 35 U.S.C. §119 from German Patent Application No. DE 10 2011 006 646.2, filed Apr. 1, 2011, the entire disclosures of which are herein expressly incorporated by reference.

BACKGROUND AND SUMMARY OF THE INVENTION

The invention relates to a tire inflation pressure control system and method in motor vehicles.

Such a system is known, for example, from German Patent document DE 41 29 554 A1 or the present assignee's German Patent document DE 195 32 386 A1. Systems of this type, in particular, have sensor devices in the interior of the tire of each wheel. These sensor devices detect, for example, the air pressure and/or the temperature in the interior of the tire, convert these physical quantities to a corresponding voltage, and transmit this information to a stationary evaluation device arranged in the vehicle. This information transmission preferably takes place in a wireless manner by use of transponders.

If, for example, "tire inflation pressure" and "temperature" information is transmitted to the evaluation device, the evaluation device will compare the tire inflation pressure, for example, with a minimally permissible threshold value that is dependent on the temperature. If there is a falling below this minimally permissible threshold value, it can be indicated to the driver by way of the evaluation device which wheel has an insufficient tire inflation pressure. For this purpose, the evaluation device has to be informed at least once as to which sensor device is assigned to which wheel. In the system according to German Patent document DE 195 32 386 A1, such an assignment automatically takes place by way of a rotational-direction sensor in the wheels in connection with a driving direction determination.

In addition, from the assignee's European Patent document EP 1 293 362 B1, a process is known for determining the tire air pressure and a tire stress quantity in the form of a so-called wheel load, the wheel load being determined by way of the tire contact area measured by a deformation sensor.

It is an object of the invention to improve a device of the above-mentioned type such that, on the one hand, a timely warning is emitted, but premature warnings or erroneous warnings are avoided.

This and other objects are achieved according to the invention by providing a tire inflation pressure control system and method in a vehicle having at least a sensor for detecting the outside temperature and a sensor device on each wheel, which transmits at least the current tire inflation pressure and the current tire temperature of the respective wheel to an evaluation device fixedly arranged in the vehicle. During an initialization operation, the evaluation device stores at least the respective tire inflation pressure and the current outside temperature as initialization values, detects their current values during the drive and, within the scope of an air loss monitoring function as well as within the scope of a separate outside-temperature-dependent load capacity monitoring function, prompts the output of at least one early warning by way of an output unit.

The invention is based on the following considerations: in the case of current tire inflation pressure control systems, in principle, the following warning strategy is in the foreground.

STATE OF THE ART

With respect to the strategy of the warning of decreased pressures, current tire pressure control systems assume that a lowering of pressure always has to result in a warning. The actual inflation pressure in a tire is measured and is compared with a pressure threshold, which had been fixedly programmed into the system or had previously been confirmed by the driver as the correctly set pressure. The warning threshold, at which the warning is emitted, is preset by legislative regulations or is fixed by the system manufacturer.

DISADVANTAGES OF THE STATE OF THE ART

In its testing procedure, the legal requirement is based on the assumption that the vehicle is parked in a previously conditioned state, that the tire inflation pressure was set correctly, and that, in the course of the checking of the operability of the tire pressure warning system, the external conditions, such as in particular the outside temperature, the barometric pressure and the load condition, are constant. As a result, warning thresholds may be required to be very strict in order to thereby reach other goals, such as the fastest possible recognition of a flat tire, or the avoidance of additional $CO_2$ emissions because of an increased rolling resistance.

If a vehicle is used on a daily basis, the respective external conditions will not be constant. In order to ensure a best possible functioning of the vehicle, the customer would have to check the tire pressure at very brief intervals (the operating instructions recommend every 2 weeks or if there are changes of use) and would have to newly set the tire pressure, and in the process would also have to ensure that the checking always takes place when the tires are cold (i.e. the initialization temperature is equal to the outside temperature). Even a lowering of the temperature by approximately 25° C., which is definitely normal in the transition times between morning temperatures and noon temperatures, will result in a warning that cannot be understood by the customer. This leads to a loss of confidence in the system, which is counterproductive with respect to the legislator's goals.

MEASURES ACCORDING TO THE INVENTION

According to the invention, a warning strategy is provided which determines in a mutually separate manner the various effects that may occur in a tire, and makes it possible to mutually separately evaluate the increments and their priority in the display or indication to the driver. This takes place in connection with a sensor, which can transmit at least the outside temperature and, preferably, also the barometric pressure, and can transmit this information to the evaluation unit, which is present anyhow for detecting the tire inflation pressure and the tire temperature. As a result, in addition to the loss of air (air loss monitoring function), the load capacity of the tire (load capacity monitoring function, particularly a separate static monitoring function) can be evaluated at least as a function of the outside temperature. The evaluation device preferably receives still further input signals, such as the vehicle velocity, the tire contact area and/or the vehicle load, whereby also a (dynamic) tire stress (tire stress function, particularly a separate dynamic monitoring function) can be taken into account for an indication or display to the customer. Dynamic tire stress is an influence that has a greater effect during the drive than when the vehicle is standing still.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
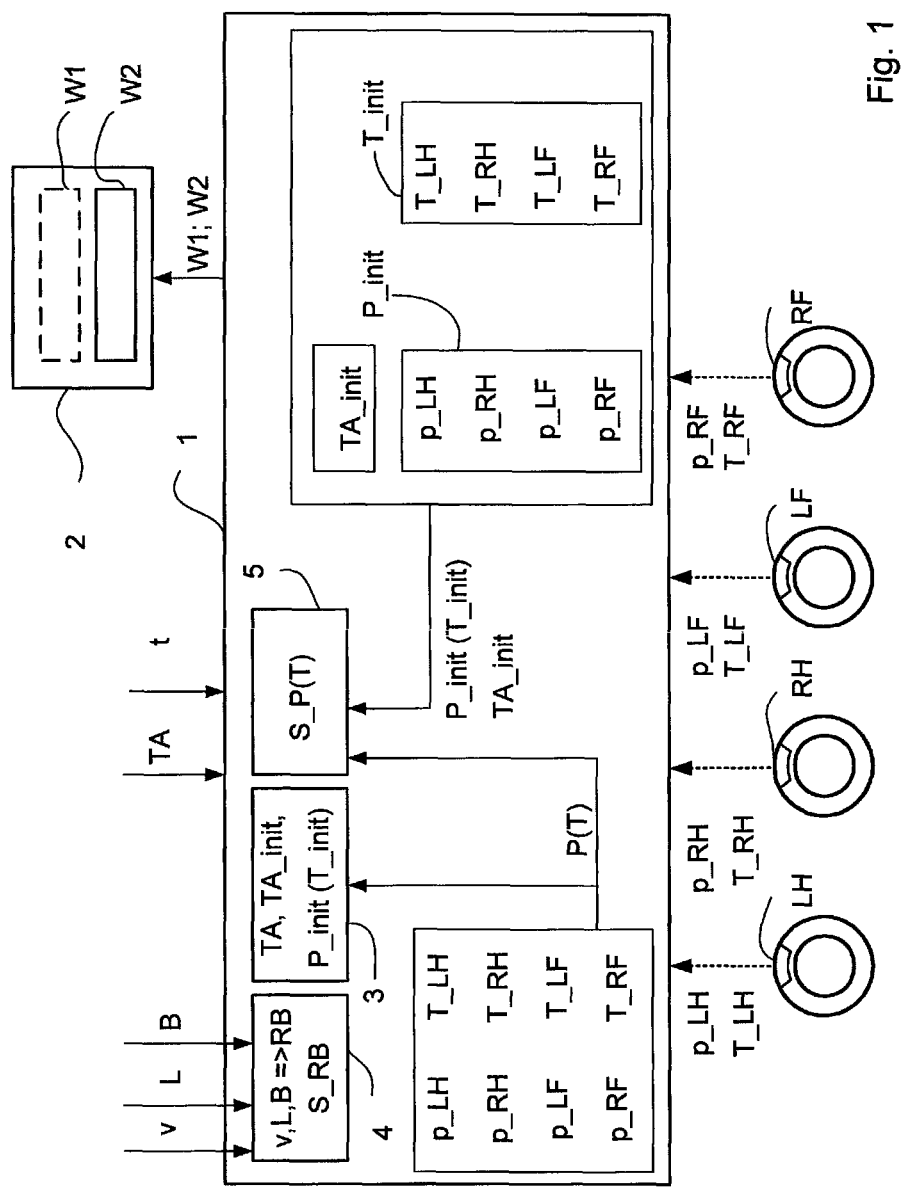
FIG. 1 is a schematic diagram of an example of the totality of the components of the tire inflation pressure control system according to the invention.

FIG. 1 illustrates a tire inflation pressure control system consisting of an evaluation device 1, an output unit 2 for the output of visual and/or acoustic warnings W1 and W2 to the driver, and the wheels LH, RH, LF and RF of a vehicle, each having a sensor unit. The sensor unit of the wheel LH, for example, sends the respectively measured tire inflation pressure p_LH at the respective tire temperature T_LH to the evaluation device 1. In the following, the respective current tire inflation pressure values p_LH, p_RH, p_LF and p_RF of each individual wheel, at the respective current tire temperature values T_LH, T_RH, T_LF and T_RF of each individual wheel will be summarized as P(T). As further input signals from its own sensors or from sensors of other control devices, the evaluation device 1 receives, in particular, the vehicle velocity v, the tire contact area L, the vehicle load B and, if required, the time t for the time between engine starts.

Exemplary Embodiment

At an outside temperature TA_init, the customer sets a tire pressure P_init at a tire temperature T_init. These values are stored in the evaluation device 1, for example, in the form of an evaluating unit of an electronic control unit. Should the tire temperature T_init differ from TA_init at the point in time of the initialization, a compensation of the pressure P(T_init) will be carried out up to an adjustable difference D_Tinit=T_init−TA_init, according to the known formula:

$$P\_init(TA\_init) = (P\_init(Tinit) + P\_Bar) * TA\_init / T\_init - P\_Bar,$$

wherein P_Bar is the barometric pressure, and the temperatures (TEMP) are to be taken into account here in Kelvin. Should the difference D_Tinit be greater than a given maximal threshold, the initialization will be rejected with a reference to an incorrect implementation.

Figure 2:
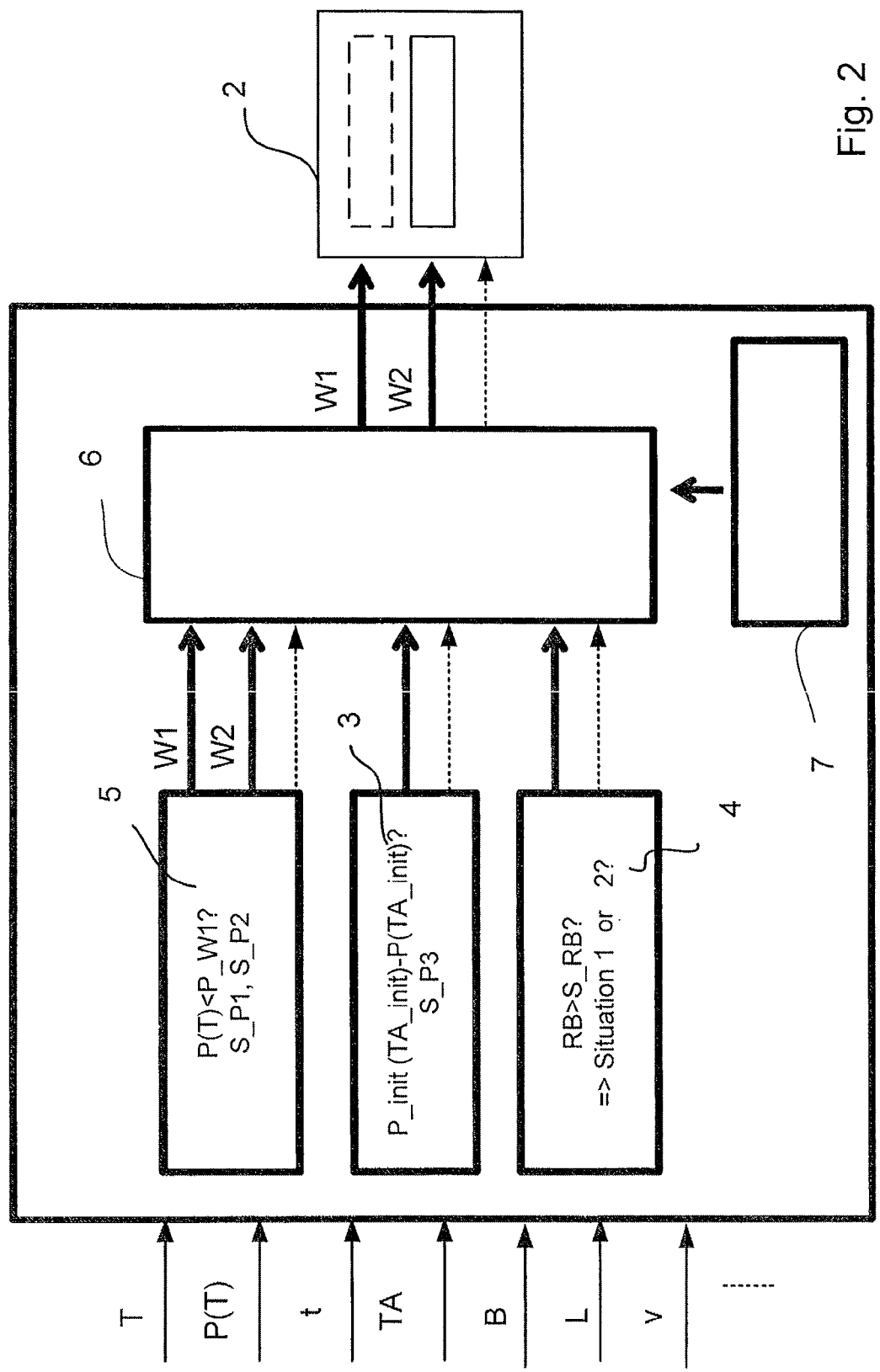
FIG. 2 is a schematic diagram of important components for establishing a warning strategy according to the invention in the evaluation device.

As also illustrated in detail in FIG. 2, three separate monitoring functions are integrated in the evaluation device 1 in the form of program modules 3, 4 and 5: The air loss monitoring function 5, the load capacity monitoring function 3 and the tire stress monitoring function 4. As a result of these three monitoring functions 3, 4 and 5, a new warning strategy is carried out by the evaluation device 1. On the basis of the output signals of the three separate monitoring functions, the corresponding warning—here, the early warning W1 and the main warning W2—is emitted in a prioritizer 6 as a result of a given desired warning strategy.

Figure 3:
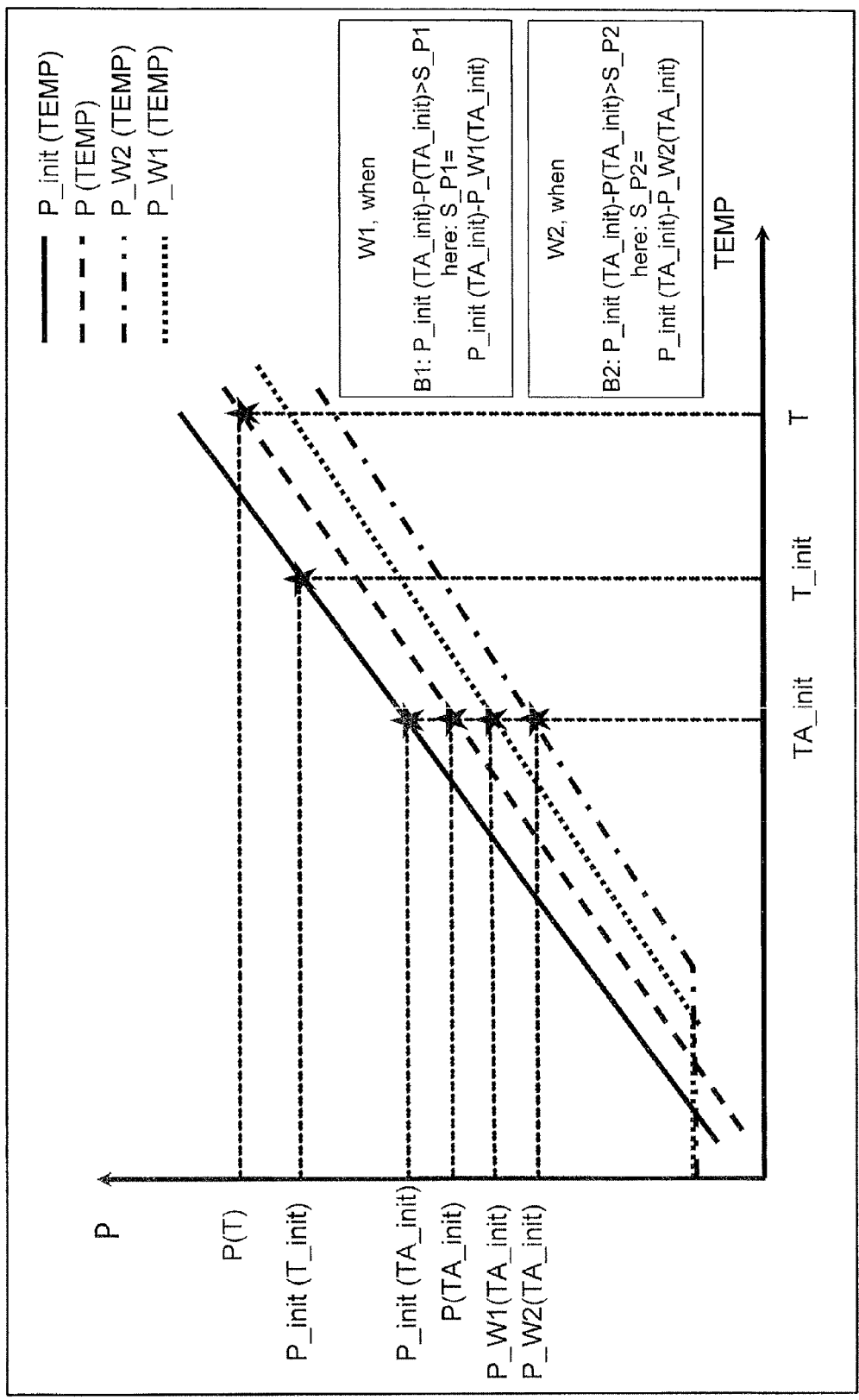
FIG. 3 is a graphical view of an example of threshold values of the air loss monitoring function.

With reference to FIG. 3, an exemplary warning strategy is described on the basis of the air loss monitoring function 5.

The initialized tire inflation pressure P_init(TA_init) is compared with the current tire pressure P(T) in two different manners. The current tire pressure P(T) is converted according to the formula P(TA_init)=(P(T)+PBar)*TA_init/T−P_Bar and is compared by the comparison of P(TA_init) and P_init(TA_init). In this case, different thresholds are taken into account: A first threshold P_W2(TEMP), which is preset by meeting the legal requirement and requires a direct pressure loss main warning W2; however, also a lower threshold P_W1(TEMP), which causes an early warning W1. In addition, preferably the differential value or percentage of the pressure drop relative to P_init(TA_init) is determined. By means of this computation, a warning of the current loss of air molecules is prompted in the form of an early warning W1 or is sent at least to the prioritizer 6.

Figure 4:
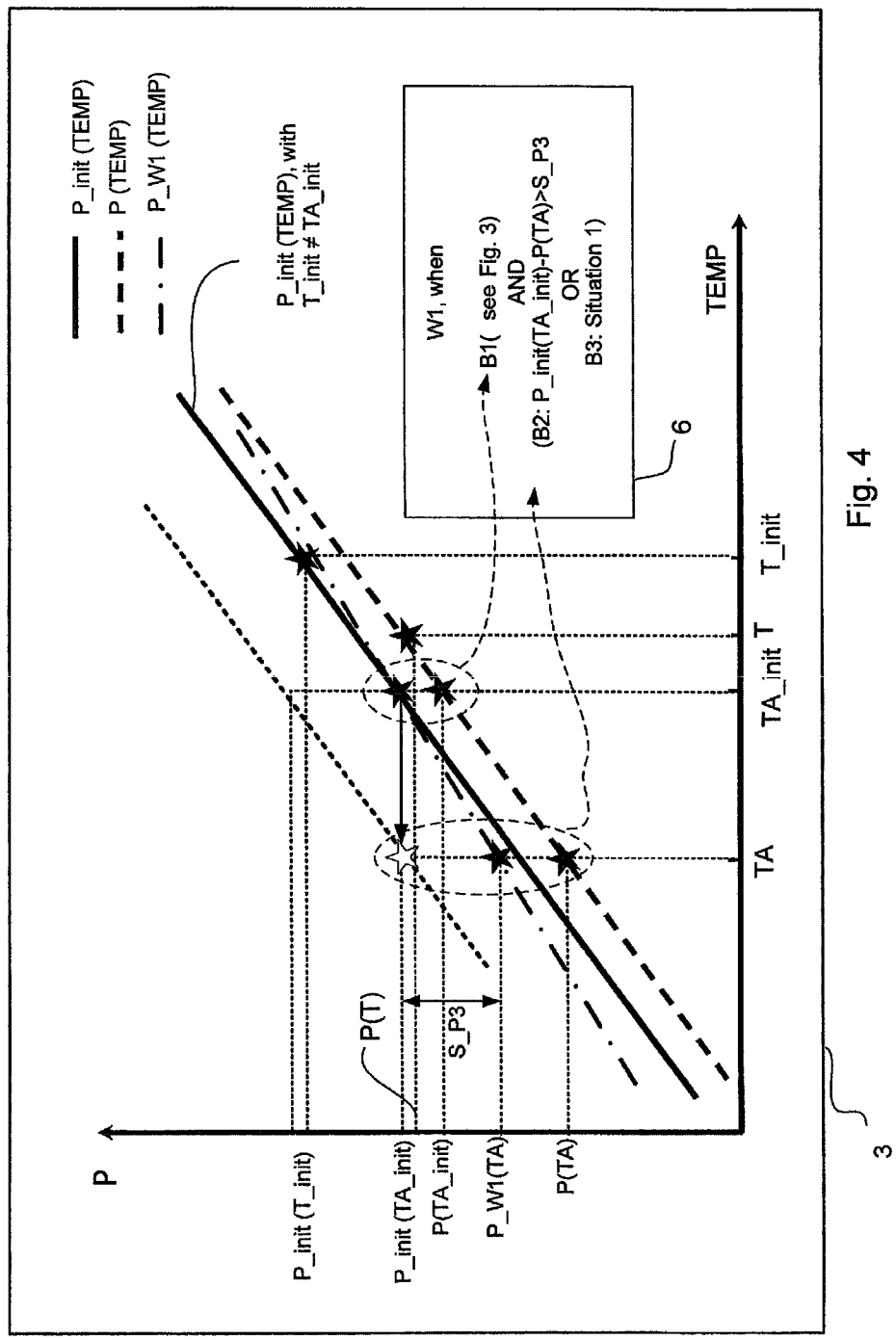
FIG. 4 is a graphical view of an example of threshold values of the load capacity monitoring function.

With reference to FIG. 4, an exemplary warning strategy based on the load capacity monitoring function 3 is described.

By way of formula P(TA)=(P(T)+P_Bar)*TA_init/T−P_Bar, the current tire pressure is converted to the current outside temperature TA. This pressure is now compared with the initialization pressure P_init(TA_init), specifically without considering the temperature. The comparison of the difference of P_init(TA_init)−P(TA) with a threshold, which can also be defined as a percentage of P_init(TA_init), causes an early warning W1 of the load capacity monitoring function. In addition, the percentage of the pressure drop relative to P_init (TA_init) can also be determined. By means of this consideration, the decrease of the load capacity of the tire relative to the initialization pressure is determined by a purely static comparison.

In addition, the output of the tire stress monitoring function 4 can preferably be included in the warning strategy.

In addition to evaluating the tire pressure by measuring and comparing the pressures with thresholds according to various methods, the condition of the tire is (dynamically) determined relative to the current driving situation. Preferably, the vehicle velocity v, the tire contact area L and/or the load B are transmitted as input signals to the evaluating unit. From the above, a tire stress value RB can be determined, which can be compared with a threshold value S_RB, in order to, for example, detect an absolutely critical situation (situation 1, particularly at a high vehicle velocity v) or an absolutely uncritical situation (situation 2, particularly at a low vehicle velocity v).

In this embodiment, various detected situations are linked to form one value RB in the tire stress monitoring function 4, and this value is compared with a threshold S_RB. In addition or as an alternative, various values RB and/or situations can be emitted without linkage to the prioritizer 6 by means of the tire stress monitoring function 4, whereupon the prioritizer 6 itself can take over linking functions.

Concretely, also information, such as driver classification, the current tire temperature T, the current difference of the outside temperature TA with respect to the tire air temperature T, the gradient of TA-T, the frequency of outside temperature variations (brief variations are not taken into account) and/or the tire-specific maximal velocity can also enter into the tire stress monitoring function. In principle, processes are known for detecting tire stress but, according to the invention, this monitoring function is embedded in the new warning strategy by which separate monitoring functions lead to differentiated outputs of warnings, particularly early warnings.

The early warnings W1 of the individual monitoring functions 3, 4 and 5 may be identical or different. For the purpose of simplification, the illustrated example is only based on a single (identical) early warning W1. The point in time of the output of the early warning(s) W1 to the output unit can, for example, be coupled to the following situations, which can be stored in a filling-possibility recognition module 7 and can be retrieved:

(a) in the case of a periodic reminder to control the tire pressure,
(b) in the case of a servicing requirement of the vehicle,
(c) in the case of a need for operating mediums; filling up with gasoline, oil, gas, wiper water, a need for electric energy,
(d) when an entering into the vehicle is recognized (change of terminals after a prolonged time parked). In this situation, the tire temperature will not be higher in comparison to the outside temperature. The driving situation is safe.

The available information is evaluated in a prioritizer 6. A warning W2 because of a loss of tire air has to be indicated immediately when the threshold required by law is reached. Early warnings W1, such as filling notices, are linked to specific situations that are useful to the driver and the servicing personnel.

The evaluation of the additional information, such as the load and the vehicle handling, may require the direct output of an early warning or of a warning when the tire exhibits stress symptoms. Temporary temperature variations may delay the output of an early warning. Depending on the indicating or display possibilities in the vehicle, the output to the driver takes place with additional information which goes beyond the legally required indication or display of tire pressure losses and system failure, and which has the purpose of clarifying the situation and, together with the operating instructions, ensures a beneficial taking into account of all warnings and notices.

As a result of the warning strategy according to the invention, it becomes possible to control the warning in a situation-related manner. By means of an early warning in the manner of a notice, the driver will be informed in time concerning the condition of the tire, and the risk of a "conk-out" is thereby avoided. The taking into account of the handling characteristics and of the tire stress can result in a warning concerning the current tire condition. The introduced measure, on the one hand, ensures the avoidance of an unnecessary warning concerning the tire inflation pressure which may lead to customers' complaints and, on the other hand, a monitoring of the tire condition which permits a warning independently of the current tire inflation pressure and the monitoring possibility connected therewith. As a result, a best-possible monitoring of the tire pressure and of the tire condition can take place for the driver. The driver's readiness to take care of the tire is thereby heightened, and a positive contribution is made with respect to the legally required cutting of $CO_2$ emissions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tire inflation pressure control method for use in a vehicle having at least a sensor for detecting outside temperature and a sensor device on each wheel of the vehicle, each sensor device transmitting at least a current tire inflation pressure and a current tire temperature of a respective wheel to an evaluation device arranged in the vehicle, the method comprising the acts of:

during an initialization operation, storing, by the evaluation device, at least the respective tire inflation pressure and the current outside temperature as initialization values;

detecting current tire inflation pressure and outside temperature during a drive of the vehicle;

performing, by the evaluation device, an air loss monitoring function and a separate outside-temperature-dependent load capacity monitoring function;

prompting an output of at least one early warning via an output unit of the vehicle in response to either the air loss monitoring function or the outside-temperature-dependent load capacity monitoring function; and prompting an additional output of a main warning, beyond the at least one early warning, in further response to the air loss monitoring function.

2. The tire inflation pressure control method according to claim 1, wherein:

by way of the outside-temperature-dependent load capacity monitoring function, prompting the at least one early warning by the evaluation device when a current tire pressure converted to a current outside temperature falls below a preset threshold value, a decreasing load capacity of the tire as the outside temperature falls being factored into account when defining the preset threshold value.

3. The tire inflation pressure control method according to claim 1, wherein:

by way of the outside-temperature-dependent load capacity monitoring function, prompting the at least one early warning by the evaluation device when a difference of the current tire pressure converted to the current outside temperature with respect to the initialization pressure exceeds a preset threshold value, a decreasing load capacity of the tire as the outside temperature falls being factored into account when defining the preset threshold value.

4. The tire inflation pressure control method according to claim 1, further comprising the act of:

preventing, by the evaluation device, the early warning to be prompted by the air loss monitoring function when, because of the load capacity monitoring function, no early warning is yet to be prompted.

5. The tire inflation pressure control method according to claim 1, wherein a further monitoring function is a separate tire stress monitoring function, in which case the evaluation device additionally receives at least one current tire condition value as an input signal and forms a tire stress value therefrom; and wherein the evaluation device prompts the early warning when the tire stress value exceeds a preset threshold value.

6. The tire inflation pressure control method according to claim 5, further comprising the act of:

delaying, by the evaluation device, an early warning to be prompted by at least one of the air loss monitoring function and the load capacity monitoring function, until a tire stress value exceeds a preset threshold value.

7. The tire inflation pressure control method according to claim 1, wherein the load capacity monitoring function is implemented at a vehicle velocity below a preset velocity threshold value.

8. The tire inflation pressure control method according to claim 5, wherein the tire stress monitoring function is implemented at a vehicle velocity above a preset velocity threshold value.

9. The tire inflation pressure control method according to claim 8, wherein the load capacity monitoring function is implemented at a vehicle velocity below a preset velocity threshold value.

10. A tire inflation pressure control system for a vehicle, comprising:
   a sensor in the vehicle for detecting outside temperature;
   a sensor device associated with each wheel of the vehicle, the sensor device of each wheel transmitting at least a current tire inflation pressure and a current tire temperature of the respective wheel;
   an evaluation device arranged in the vehicle, the evaluation receiving the transmitted current tire inflation pressure and current tire temperature; and
   wherein the evaluation device is operatively configured to store, during an initialization operation, the respective tire inflation pressures and current outside temperature as initialization values; and
   wherein the evaluation device is further operatively configured to receive the current tire inflation pressure values and the current outside temperature during a drive and, and in response to either an air loss monitoring function or a separate outside-temperature-dependent load capacity monitoring function, signals an output unit to output an early warning, and wherein the evaluation device is further operatively configured to signal the output unit to output a main warning, beyond the early warning, in further response to the air loss monitoring function.

11. The tire inflation pressure control system according to claim 10, wherein the evaluation device is operatively configured to signal the output unit to provide the early warning when, via the outside-temperature-dependent load capacity monitoring function, the current tire pressure converted to the current outside temperature falls below a preset threshold value, wherein a decreasing load capacity of the tire as the outside temperature falls is factored into account in defining the preset threshold value.

12. The tire inflation pressure control system according to claim 10, wherein the evaluation device is operatively configured to signal the output device to provide the early warning when, via the outside-temperature-dependent load capacity monitoring function, a difference of the current tire pressure converted to the current outside temperature with respect to the initialization pressure exceeds a preset threshold value, wherein a decreasing load capacity of the tire as the outside temperature falls is factored into account in defining the preset threshold value.

13. The tire inflation pressure control system according to claim 10, wherein the evaluation device is operatively configured to prevent the early warning to be output based on the air loss monitoring function when, because of the load capacity monitoring function, no early warning has yet been prompted.

14. The tire inflation pressure control system according to claim 10, further comprising a separate tire stress monitoring function, wherein the evaluation device receives at least one current tire condition value as an input signal and forms a tire stress value therefrom in performing the separate tire stress monitoring function; and
   wherein the evaluation device is operatively configured to signal the output device to provide the early warning when the tire stress value exceeds a preset threshold value.

15. The tire inflation pressure control system according to claim 14, wherein the evaluation device is operatively configured to delay an early warning based on the air loss monitoring function and/or the load capacity monitoring function until the tire stress value exceeds the preset threshold value.

16. The tire inflation pressure control method according to claim 1, wherein the output of the at least one early warning, in response to the air loss monitoring function, occurs at a lower pressure threshold than the additional output of the main warning that occurs in further response to the air loss monitoring function.

17. The tire inflation pressure control system according to claim 10, wherein the output of the early warning, in response to the air loss monitoring function, occurs at a lower pressure threshold than the output of the main warning that occurs in further response to the air loss monitoring function.

* * * * *